Feb. 2, 1954  T. J. REESE ET AL  2,667,961
FEEDER FOR WHOLE FRUIT JUICERS
Filed April 2, 1948  3 Sheets-Sheet 1

TERRELL J. REESE
NYAL B. WOOD
INVENTORS.

BY

ATTORNEY

TERRELL J. REESE,
NYAL B. WOOD,
INVENTORS

ATTORNEY

TERRELL J. REESE
NYAL B. WOOD
INVENTORS

BY

ATTORNEY

Patented Feb. 2, 1954

2,667,961

UNITED STATES PATENT OFFICE 2,667,961

FEEDER FOR WHOLE FRUIT JUICERS

Terrell J. Reese, Elkhart, Ind., and Nyal B. Wood, Lakeland, Fla., assignors to Food Machinery and Chemical Corporation, a corporation of Delaware Application April 2, 1948, Serial No. 18,628

1 Claim. (Cl. 198—56)

This invention relates to feeding rollable objects in bulk and is especially useful in feeding citrus fruits to a juice extractor.

For illustrative purposes, the invention will be illustrated herein as incorporated in a feeder associated with a device for extracting juice from whole citrus fruit, the old elements of said feeder being disclosed in the co-pending application for U. S. Letters Patent of James M. Hait, Serial No. 751,158, filed May 28, 1947 on "Single Whole Fruit Feeder," now Patent No. 2,500,030.

The Hait feeder includes a circular table rotating within a surrounding wall, the table having vertical holes at its periphery, each of which is adapted to receive a single piece of fruit at a time, and from which said piece of fruit is fed to one of the extraction units.

It is an object of the present invention to provide an auxiliary device which will solve the problem of feeding fruit in bulk to the Hait feeder so that the latter will be kept adequately supplied at all times with fruit and yet not have enough fruit delivered thereto to burden the feeder or choke the operation of this.

It is another object of the invention to provide such an auxiliary device which is readily adapted to variations in the size of the fruit being delivered to the Hait feeder.

The manner of accomplishing the foregoing objects as well as further objects and advantages will be made manifest in the following description taken in connection with the accompanying drawings in which.

Figure 1:
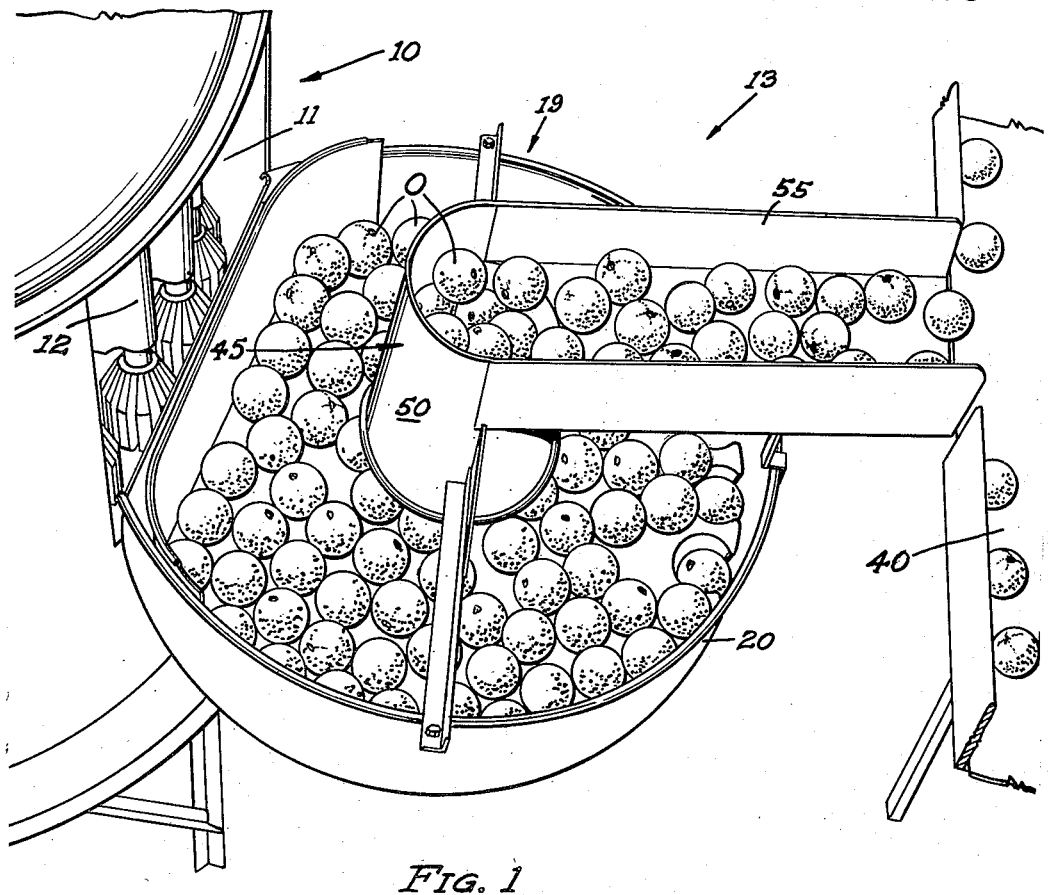
Fig. 1 is a perspective view of a preferred embodiment of the invention mounted on and associated with the Hait feeder.
Figure 2:
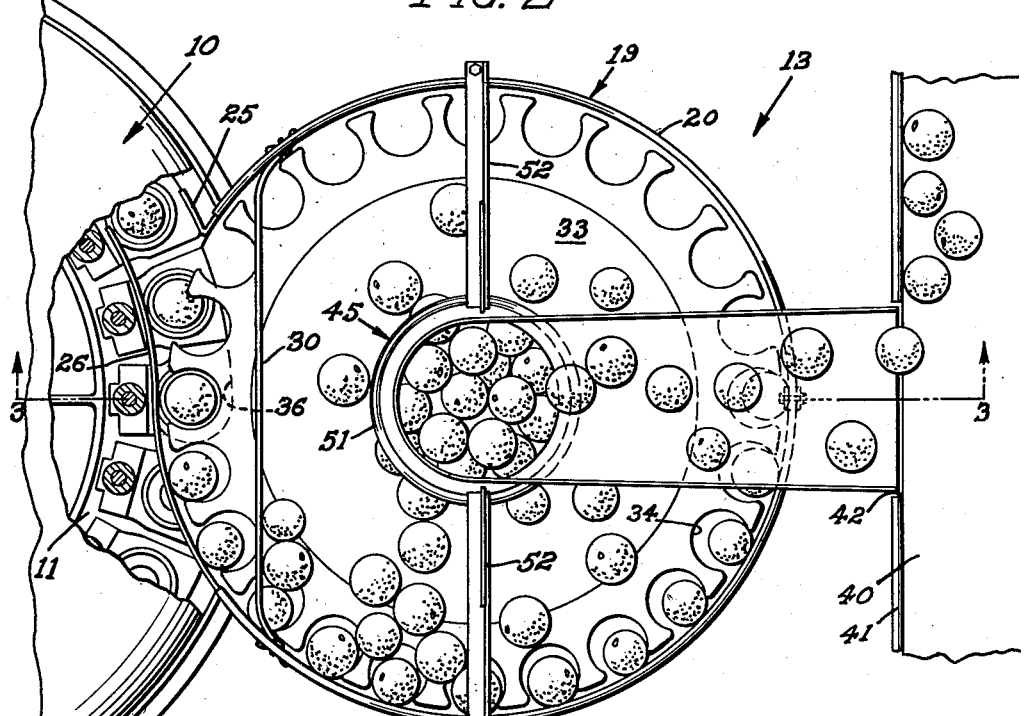
Fig. 2 is a plan view of Fig. 1.
Figure 3:
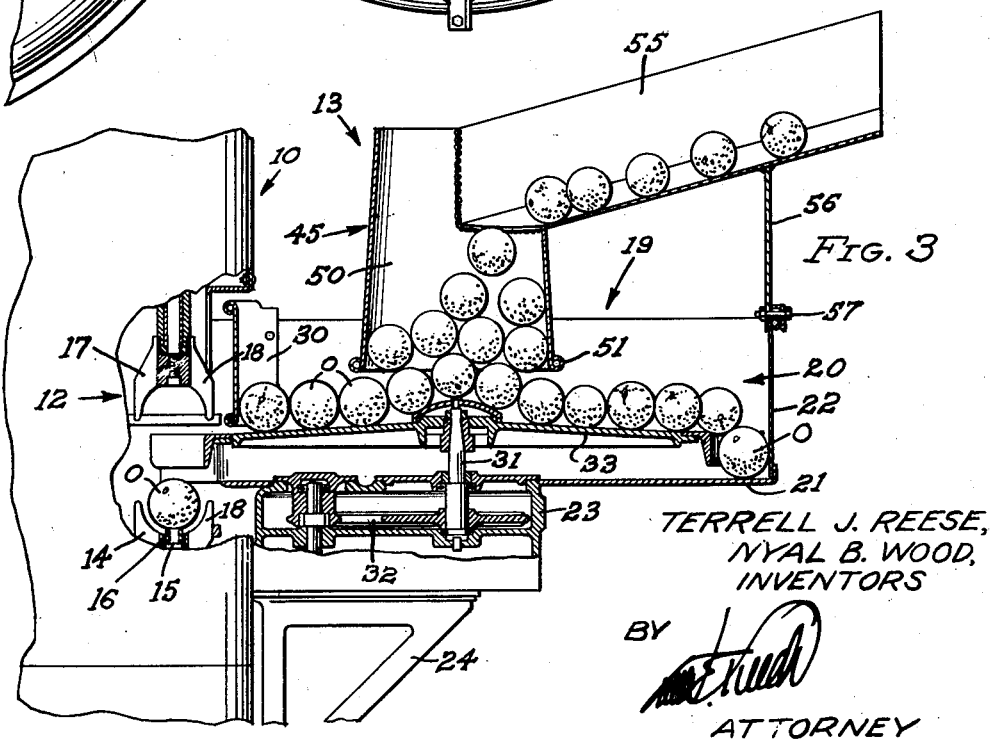
Fig. 3 is a vertical sectional view taken on the line 3—3 of Fig. 2.

Referring specifically to the drawings and particularly to Figs. 1, 2 and 3, the numeral 10 indicates a rotary machine for extracting juice from whole citrus fruit, this having a rotor 11 equipped with a series of circumferentially disposed juice extracting units 12 to which individual entities of citrus fruit such as oranges O are fed by a feeder 13.

Each extraction unit 12 includes a lower cup 14 into which an individual whole fruit is fed while this unit is rotating with the rotor 11. The cup 14 also has a juice outlet passage 15 in the upper end of which is mounted a circular cutter 16 which cuts a hole in the rind of the fruit when the fruit is pressed thereagainst. Each unit also includes an upper cup 17, the cups 14 and 17 having radial interdigitating fingers 18 and the cup 17 being actuated by the rotation of the rotor 11 to descend into interdigitating relation with the cup 14 to compress the fruit between the cups to cause the cutter 16 to cut a button from the rind and constricting the fruit so as to press the juice therefrom downwardly through the passage 15.

The feeder 13 includes a rotary feed device 19 of the Hait type mentioned above, the latter having a hopper 20, with a floor 21 and side wall 22 and which is mounted on a transmission housing 23, the latter being supported on a bracket 24 fixed on the extractor 10.

One end portion 25 of the wall 22 connects to the extractor 10 while the other end portion 26 of said wall extends therefrom as a guide for the fruit, this wall portion reversing from concentric relation with the hopper 20 into concentric relation with the rotor 11.

Connecting opposite sides of the side wall 22 (as shown in Fig. 2) is a baffle wall 30. Extending upwardly from the transmission 23 in concentric relation with the hopper 20 is a shaft 31 which connects through a transmission 32 to the extractor rotor 11 so as to rotate a feed table 33 fixed on said shaft in timed relation with said rotor. This table has vertical holes 34 in its periphery which extends close to the side wall 22. Each of these holes is adapted to receive a single orange O with the latter resting on the floor 21. This orange is carried along by the rotation of the table 33 until it comes opposite a discharge opening 36 in the floor 21 at a time that this orange is directly over the lower cup 14 of one of the extraction units 12. Thus each of these units receives a whole orange O from the feeder 13 when said unit reaches a point in its rotation where the cup 17 thereof is raised and one of the holes 34 of the feeder 13 comes between and into vertical alignment with the cups 14 and 17 of this unit as shown in Figs. 2 and 3.

The juice extractor 10 is preferably located close to and at a lower level than a conveyor 40 having a side wall 41 with an opening 42 therein through which fruit may be delivered from said conveyor to the juicer 10.

The present invention has to do with the problem of getting fruit from the conveyor 40 into the hopper 20 so as to keep an adequate supply on the table 33 without an excess of fruit being delivered to this table. This is accomplished by the provision of an auxiliary feed device 45 including a tube 50 which increases in diameter towards its lower end where it is equipped with an annular bead 51. This tube is supported on angle iron members 52 which are bolted at their opposite ends to the feeder side wall 22 and has a chute 55 formed integrally therewith. This chute is inclined upwardly with its open upper end located opposite the opening 42 in the conveyor wall 41.

The chute 55 has a leg 56, the lower end of which is secured to the wall 22 by a bolt 57. The tube 50 is thus supported with the lower end thereof spaced from the table 33 a slightly greater distance than the diameter of the largest fruit passing through the tube 50 into the hopper 20.

Obviously the rotation of the table 33 rolls oranges O resting on the table and within the area of the tube 50 outwardly from underneath the bead 51 so that these oranges are free to roll down the inclined surface of the table 33 into one of the holes 34, thus assuring a supply of oranges sufficient to keep these holes filled when the latter travel into orange feeding positions beyond the baffle wall 30. The latter wall operates to prevent fruit rolling into any of the holes 34 while the latter are disposed over the opening 36 in the floor 21. Thus each hole 34 receives a single piece of fruit before it passes under the wall 30, delivers this piece of fruit into one of the cups 14 when it comes in vertical alignment with this, and then continues empty until it returns under the baffle wall 30 into the hopper 20 where it may receive another piece of fruit.

Figure 4:
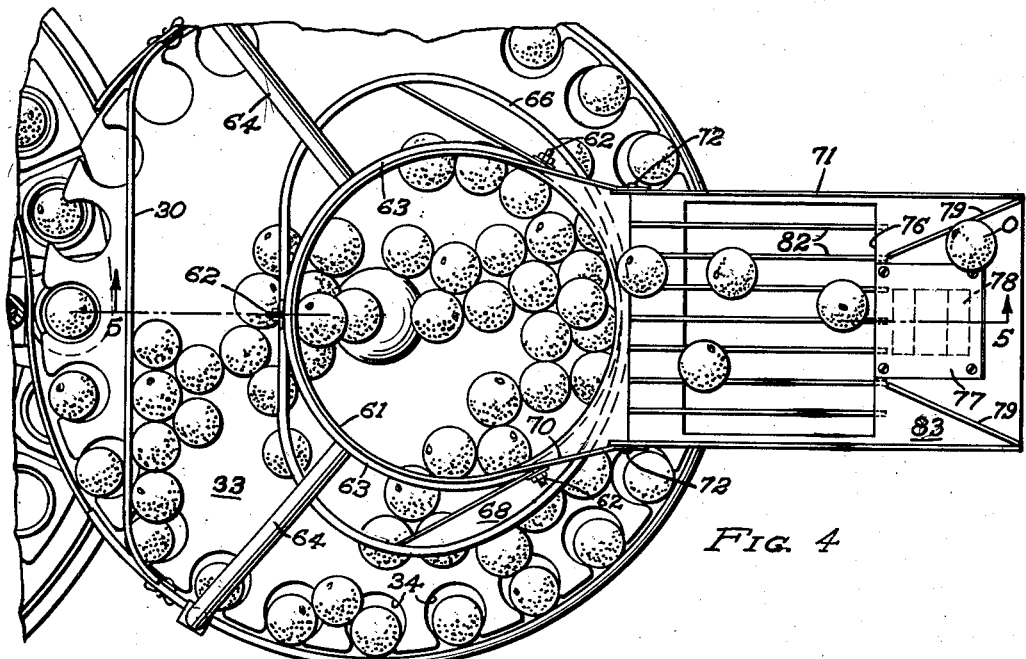
Fig. 4 is a plan view of a modified form of the invention.
Figure 5:
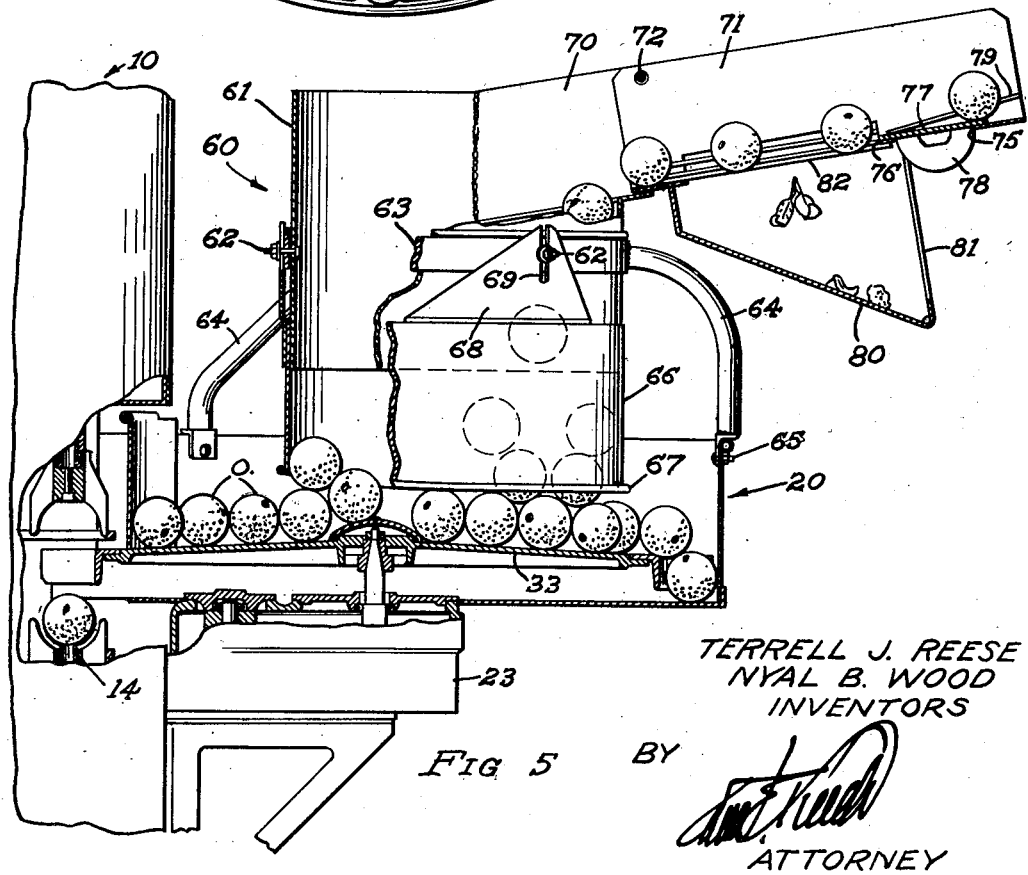
Fig. 5 is a vertical sectional view taken on the line 5—5 of Fig. 4.

Referring now to Figs. 4 and 5, a modified form 58 of the feeder of this invention is shown. This includes the Hait feeder 19 and an auxiliary device 60 having a tube 61 which is considerably larger in diameter than the tube 50 of the device 45 shown in Figs. 1, 2 and 3. This tube is supported by bolts 62 passing through a ring 63 having legs 64 which rest on the side wall 22 of the hopper 20 and are secured thereto by bolts 65.

Slideably receiving the lower end of the tube 61 and telescopically related thereto, is a lower extension 66 of said tube. The lower end of this extension is provided with an annular bead 67 and its upper end has three ears 68 containing slots 69 through which the bolts 62 extend, thereby permitting vertical adjustment of the tube extension 66 to vary the spacing of the lower end of this from the feed table 33.

It is to be noted that the axis of the tube 61 is eccentric with respect to the axis of the feed table 33 and on the opposite side thereof from the juicer 10.

It is also to be noted in Fig. 4 that while the tube 61 is circular in cross-section, the extension 66 thereof is ovaloid in cross-section, and that the portion of the extension 66 disposed adjacent to the hopper side wall 22 is concentric with that side wall.

The enlargement and off-setting, in the manner noted, of the tube 61 is to bring the area covered by the tube and by its extension 66 into overlying relation with a faster moving portion of the table 33 than is the case with the tube 50, and to cause portions of the table to move from within the area circumscribed by the tube extension 66 across the boundary of this area and outwardly therefrom so as to cause the discharge of fruit from said area into the space between the tube extension 66 and the hopper side wall 22, whereby the fruit is free to gravitate into one of the holes 34 in the feed table 33.

The peculiar ovaloid shape given to the extension 66 enhances this action and reduces the opportunity for fruit to jam between the tube extension 66 and the side wall 22 due to this shape minimizing the convergence between said extension and said side wall.

The tube 61 is provided with a mouth 70 to which a chute 71 is connected by pivots 72, this chute inclining upwardly to a conveyor such as the conveyor 40, and transmitting fruit received therefrom by gravity into the tube 61 and extension 66.

The chute 71 has two openings 75 and 76. The opening 75 is covered by a dia-magnetic plate 77 to the bottom of which is attached a magnet 78. Guide rods 79 centralize the oranges O as well as any pieces of ferrous metal which might have accidentally become mixed with the oranges fed to the chute 71 from the conveyor 40. The magnet 78 exerts an attraction on such pieces of metal which is strong enough to hold these against the upper face of the plate 77 until an attendant making his regular rounds of inspection, will find these and remove them. This feature is for the protection of the juicer 10, the compression cups of which are susceptible to damage in case any pieces of metal secure admission to these cups during the operation of the juicer 10.

The chute 71 is also provided with a trash bin 80 which encloses the space beneath the chute into which the holes 76 open, the bin 80 having a rear opening 81 from which trash deposited therein may be removed.

Crossing the hole 76 are rods 82, the rear ends of which are secured to the underside of the floor 83 of the chute 71 and the forward ends of which are secured to the top surface of this floor. The rods 82 are parallel and spaced apart closely enough to support the smallest fruit handled by the juicer 10, yet far enough apart so that leaves, brush, and miscellaneous debris entering the chute 71 from the conveyor 40 will drop between the rods 82 into the trash bin 80.

*Operation*

From the foregoing description, it is clear that even though the tube 50 or 61 of the invention should be filled with fruit during a peak delivery thereto of fruit from the conveyor 40, this fruit would be discharged from the lower end of the tubular feeder onto the feed table 33 at a rate no greater than the rate at which the fruit is fed from the feeder 13 to the juicer 10.

This limitation of the amount of fruit which may be fed outwardly from the lower end of the tube 50 is accomplished by virtue of the fact that when the table 33 becomes covered with fruit, the fruit directly under the bead 51 moves outwardly only as the fruit covering the periphery of the table 33 is depleted by entities thereof dropping downwardly into the peripheral feed holes 34. In the feeder 60, this balance is effected by the same action in the concentric portion of the wall of the lower tube extension 66 while the outward feeding of fruit from within this extension, due to the surface of the table 33 passing out from within the area enclosed by this extension, is balanced by the returning of fruit into the extension where the surface of the feed table 33 moves back into the area covered by the extension. The latter action would take place, of course, only when the feed table 33 is substantially covered with fruit which would not normally take place in the operation of the machine as with each revolution of the table 33, 24 pieces of fruit are discharged through the holes 34 of the table 33 into the extraction units 12 of the juicer 10.

What the feeder of the present invention accomplishes is to prevent fruit being fed onto the feeder table 33 at a rate fast enough to produce more than a single layer of fruit at a time on those portions of the table 33 outside the area of the feeding tubes.

This is particularly advantageous in preventing the fruit resting on the table 33 from piling up so deeply against a shear board 30 as to offer a substantial resistance to the driving of the feed table 33.

The claim is:

In a single whole fruit feeder, the combination of: a hopper having a floor and side walls; a feeder wheel, rotatably mounted in said hopper in spaced relation with said floor, individual fruit holding holes being provided in a peripheral portion of said wheel, said holes opening downward to permit individual fruit entities contained therein to rest on said floor, there being an opening in said floor through which individual fruit entities contained in said holes are discharged successively; a tube disposed over said feeder wheel for delivering whole fruit downwardly into said hopper; means for supporting said tube in said position; and a telescopic mouth section mounted on said tube with its lower edge spaced from said feeder wheel a distance approximately equal to the diameter of the fruit being delivered, said mouth section being adjustably related to said feeder wheel to vary the vertical dimension of the opening therebetween through which fruit is fed onto said wheel, said mouth section being elliptical in plan outline, and eccentrically located relative to said wheel with a substantial portion of said mouth section arcuately shaped and disposed in concentric relation with adjacent portions of said hopper side walls.

TERRELL J. REESE.
NYAL B. WOOD.

References Cited in the file of this patent

UNITED STATES PATENTS

| Number | Name | Date |
|---|---|---|
| 990,593 | Ringland et al. | Apr. 25, 1911 |
| 1,435,743 | Salfisberg | Nov. 14, 1922 |
| 1,446,591 | Small | Feb. 27, 1923 |
| 1,823,995 | Streby | Sept. 22, 1931 |

FOREIGN PATENTS

| Number | Country | Date |
|---|---|---|
| 277,347 | Germany | Aug. 11, 1914 |